United States Patent [19]

Cifuentes et al.

[11] Patent Number: 5,302,671
[45] Date of Patent: Apr. 12, 1994

[54] MOISTURE-CURABLE COMPOSITIONS CONTAINING AMINOALKOXY-FUNCTIONAL SILICONE

[75] Inventors: Martin E. Cifuentes; William P. Brady; William N. Fenton; Randall G. Schmidt; Michael R. Strong; David L. Stickles; Bernard VanWert, all of Midland, Mich.

[73] Assignee: Dow Corning Corporation, Midland, Mich.

[21] Appl. No.: 76,619

[22] Filed: Jun. 11, 1993

[51] Int. Cl.$^5$ .............................................. C08G 77/38
[52] U.S. Cl. ..................................... 525/477; 528/17; 528/18; 528/38
[58] Field of Search ................... 525/477; 528/38, 17, 528/18

[56] References Cited

U.S. PATENT DOCUMENTS

| | | | |
|---|---|---|---|
| 4,143,088 | 3/1979 | Favre | 260/825 |
| 4,191,817 | 3/1980 | Schiller | 528/38 |
| 4,865,920 | 9/1989 | Sweet | 428/447 |
| 4,882,377 | 11/1989 | Sweet | 524/267 |
| 5,013,781 | 5/1991 | Koshii | 524/864 |
| 5,091,484 | 2/1992 | Colas | 525/477 |
| 5,147,916 | 9/1992 | Sweet | 524/266 |
| 5,162,410 | 11/1992 | Sweet | 524/266 |
| 5,208,300 | 5/1993 | Krahnke | 525/474 |

FOREIGN PATENT DOCUMENTS 5140458 3/1977 Japan.
481487 6/1992 Japan.

*Primary Examiner*—Melvyn I. Marquis
*Attorney, Agent, or Firm*—Sharon K. Severance

[57] ABSTRACT

A moisture-curable silicone composition, suitable for use as a coating or pressure-sensitive adhesive, is disclosed, said composition comprising (i) a hydroxyl-functional organopolysiloxane resin comprising $R_3SiO_{\frac{1}{2}}$ siloxane units and $SiO_{4/2}$ siloxane units in a molar ratio of 0.5/1 to 1.2/1. respectively, wherein R is a hydrocarbon or halogenated hydrocarbon radical: (ii) a diorganopolysiloxane polymer having at least two silicon-bonded alkoxy groups and at least one carbon-bonded amine group in its molecule, said polymer having a viscosity at 25° C. of 20 to 100,000 centipoise, the weight ratio of said resin to said polymer being in the range 20:80 to 80:20; (iii) optionally, a hydrolyzable silane in sufficient amount to provide stability to said composition; and (iv) optionally, sufficient catalyst to accelerate the cure of said composition.

28 Claims, No Drawings

MOISTURE-CURABLE COMPOSITIONS CONTAINING AMINOALKOXY-FUNCTIONAL SILICONE

FIELD OF THE INVENTION

The present invention relates to a curable silicone composition. More particularly, the invention relates to a silicone coating, pressure-sensitive adhesive or a hot melt pressure-sensitive adhesive which is based upon an aminoalkoxyfunctional diorganopolysiloxane polymer and which cures upon exposure to ambient moisture.

BACKGROUND OF THE INVENTION

Silicone pressure-sensitive adhesives (hereinafter also referred to as PSAs) typically contain at least two primary components, namely a linear siloxane polymer and a tackifier resin consisting essentially of triorganosiloxane (M) units (i.e., $R_3SiO_{\frac{1}{2}}$ units. in which R denotes a monovalent organic group) and silicate (Q) units (i.e., $SiO_{4/2}$ units). In addition to the above two ingredients, silicone PSA compositions are generally provided with some crosslinking means (e.g., peroxide or hydrosilation cure systems) in order to optimize various properties of the final adhesive product. In view of the high viscosity imparted by the polymer component, these PSA compositions are typically dispersed in an organic solvent for ease of application. Some of these PSAs contain reactive groups which allow the compositions to be cured by exposure to moisture. When the proportions of the above described resin and polymer and other parameters are adjusted similar combinations can be formulated into coating compositions. Under certain other conditions, hot melt PSAs can be obtained. The following citations illustrate the range of such compositions.

U.S. Pat. No. 4,865,920 to Sweet describes solventless silicone PSAs that can be applied as a heated melt, also referred to as a hot melt. These compositions differ from prior art PSAs by replacement of the gum type polydiorganosiloxane with a liquid polydiorganosiloxane and by addition of from 1 to 10 percent, based on the combined weight of the organosilicon compounds, of a liquid ester of a monocarboxylic acid containing from 2 to 32 carbon atoms. Replacing this ester with a phenyl-containing polyorganosiloxane fluid to make the PSA more compatible with drugs and other organic materials is described in U.S. Pat. No. 5,162,410, also to Sweet. The hot melt PSAs described in both Sweet patents do not contain moisture reactive groups capable of forming a cured material, and therefore remain flowable at elevated temperatures and retain their tacky character.

A copending application, Ser. No. 07/748,478, filed on Aug. 22, 1991 (EP Publication 529841 A1) to Krahnke et al. describes silicone PSAs that cure in the presence of moisture to permanent adhesives. The compositions are particularly useful as structural adhesives for adhering glass panels to structural materials such as concrete, aluminum and steel. The two required ingredients of the PSA are an MQ resin and a high consistency polydiorganosiloxane gum. One or both ingredients of the PSA compositions described in this copending application contain moisture activated alkoxy curing groups. Due to the high viscosity of gum type polydiorganosiloxanes even at elevated temperatures, the compositions are not suitable for application as heated molten materials and are typically applied in solution form wherein the solvent is removed prior to curing of the composition or evaporates during the curing reaction.

Another moisture-curable PSA system is disclosed in Japanese laid open patent application (Kokai) No. 4(1992)/81,487. These PSAs comprise (1) 100 parts by weight of an MQ resin having a hydroxyl content of up to 0.7 weight percent, (2) a liquid polydiorganosiloxane containing hydrolyzable terminal groups and (3) a condensation catalyst to promote curing of the composition in the presence of moisture. The molar ratio of silanol groups in the resinous copolymer to hydrolyzable terminal groups in the liquid polydiorganosiloxane is from 1 to 10. A characterizing feature of these compositions is their ability to retain the characteristics of pressure sensitive adhesives under both dry and wet conditions following reaction of the moisture reactive groups.

U.S. Pat. No. 5,091,484 to Colas et al. describes elastomer-forming compositions containing (1) a hydroxyl- or alkoxy-terminated polydiorganosiloxane, (2) an alkoxy-functional MQ resin that is preferably liquid under ambient conditions and (3) a titanium-containing curing catalyst. These compositions are described as flowable under ambient conditions and cure in the presence of atmospheric moisture to yield elastomeric materials.

Moisture-curable compositions which cure to elastomers are also disclosed by Favre et al. in U.S. Pat. No. 4,143,088. These compositions are prepared by mixing (a) a hydroxyl-terminated polydiorganosiloxane, (b) an MQ resin, (c) an alkoxylated organosilicon compound and (d) an organic titanium derivative. Before being cured, these systems are liquids under ordinary conditions.

When the above systems rely upon alkoxy-functional groups for their cure by ambient moisture they require an organometallic catalyst in order to attain a reasonable cure rate. The addition of such catalysts may not be desirable in certain applications since these compounds can contribute to side reactions. Such reactions can reduce shelf life of the uncured adhesive and contribute to network bond rearrangement and reversion in the cured product which leads to the deterioration of physical properties. Furthermore, with the current emphasis on the control of volatile organic compound (VOC) emission, the use of conventional PSAs and solvent-borne coatings is losing favor and there is an ever growing need for systems which contain little or no solvent. Additionally, many applications require that an essentially instant bond be formed between parts so that the parts can be transported or otherwise manipulated without waiting for a solvent to evaporate or the composition to cure. This characteristic is defined herein as "green strength" and is manifested by high initial adhesive strength of the PSA.

SUMMARY OF THE INVENTION

The above noted deficiencies of prior art compositions is addressed by the coating and PSA compositions of the present invention. The compositions disclosed herein require little or no catalyst in order to cure in relatively short order. They are therefore less susceptible to the side reactions and reversion noted above (i.e., no catalyst or less catalyst is needed to obtain a given cure rate). Moreover, preferred compositions of the invention are curable hot melt PSAs which have a high level of instant tack and green strength, said compositions being essentially solvent-free. Such preferred systems are non-slump solids under ambient conditions but can be heated to a flowable liquid state and applied as such to substrates by methods now employed to dispense hot melt organic adhesives. Further, the preferred hot melt PSAs, which can be stored as one-part systems for extended periods, cure to form elastomers when exposed to moisture, the cured composition providing an even stronger bond than its corresponding green strength value. Unlike compositions which remain PSAs after cure, certain cured PSA compositions of the present invention can be handled after curing and they exhibit limited dirt pick-up and contamination when an excess of the material overflows the intended bond area. Such contamination is undesirable from an aesthetic perspective as well as from performance considerations in electronic applications.

The present invention therefore relates to a moisture-curable silicone composition comprising:

(i) a hydroxyl-functional organopolysiloxane resin comprising $R_3SiO_{\frac{1}{2}}$ siloxane units and $SiO_{4/2}$ siloxane units, wherein the mole ratio of the $R_3SiO_{\frac{1}{2}}$ siloxane units to $SiO_{4/2}$ siloxane units has a value of from 0.5/1 to 1.2/1 and R is selected from the group consisting of hydrocarbon radicals and halogenated hydrocarbon radicals;

(ii) a diorganopolysiloxane polymer having at least two reactive silicon-bonded alkoxy groups and at least one carbon-bonded amine group in its molecule, said polymer having a viscosity at 25° C. of 20 to 100,000 centipoise, the weight ratio of said resin to said polymer being in the range 20:80 to 80:20;

(iii) optionally, a hydrolyzable silane in sufficient amount to provide stability to said composition: and (iv) optionally, a catalyst to accelerate the cure of said composition.

DETAILED DESCRIPTION OF THE INVENTION

Component (i) of the present invention is a soluble, hydroxyl-functional organopolysiloxane resin comprising $R_3SiO_{\frac{1}{2}}$ siloxane units and $SiO_{4/2}$ siloxane units. By the term soluble it is meant that the organopolysiloxane can be dissolved, substantially completely, in either a hydrocarbon liquid such as benzene, toluene, xylene, heptane and the like or in a silicone liquid such as cyclic or linear polydiorganosiloxanes. Preferably the resin is soluble in component (ii), delineated below.

In the formula for resin (i), R denotes a monovalent radical selected from the group consisting of hydrocarbon and halogenated hydrocarbon radicals, preferably having less than 20 carbon atoms, and most preferably having from 1 to 10 carbon atoms. Examples of suitable R radicals include alkyl radicals, such as methyl, ethyl, propyl, pentyl, octyl, undecyl and octadecyl; cycloaliphatic radicals, such as cyclohexyl: aryl radicals such as phenyl, tolyl, xylyl, benzyl, alpha-methyl styryl and 2-phenylethyl; alkenyl radicals such as vinyl: and chlorinated hydrocarbon radicals such as 3-chloropropyl and dichlorophenyl.

To enhance the solubility of component (i) in component (ii), described infra, it is desirable to select the predominant organic radicals of the former to match the predominant organic radicals of the latter. Preferably, at least one-third, and more preferably substantially all R radical in the formula for component (i), are methyl radicals. Examples of preferred $R_3SiO_{\frac{1}{2}}$ siloxane units include $Me_3SiO_{\frac{1}{2}}$, $PhMe_2SiO_{\frac{1}{2}}$ and $Ph_2MeSiO_{\frac{1}{2}}$ where Me hereinafter denotes methyl and Ph hereinafter denotes phenyl.

Component (i) includes a resinous portion wherein the $R_3SiO_{\frac{1}{2}}$ siloxane units (i.e., M units) are bonded to the $SiO_{4/2}$ siloxane units (i.e., Q units), each of which is bonded to at least one other $SiO_{4/2}$ siloxane unit. Some $SiO_{4/2}$ siloxane units are bonded to hydroxyl radicals resulting in $HOSiO_{3/2}$ units (i.e., TOH units), thereby accounting for the silicon-bonded hydroxyl content of the organopolysiloxane. In addition to the resinous portion, component (i) can contain a small amount of a low molecular weight material comprised substantially of a neopentamer organopolysiloxane having the formula $(R_3SiO)_4Si$, the latter material being a byproduct in the preparation of the resin according to the methods of Daudt et al., described infra.

For the purposes of the present invention, the ratio of $R_3SiO_{\frac{1}{2}}$ siloxane units to $SiO_{4/2}$ siloxane units has a molar ratio of 0.5 to 1.2, respectively. It is preferred that the mole ratio of the total M siloxane units to total Q siloxane units of (i) be between 0.6 and 0.95, The above M/Q mole ratios can be easily obtained by $^{29}Si$ nuclear magnetic resonance, this technique being capable of a quantitative determination of the molar contents of: M (resin), M(neopentamer), Q (resin), Q(neopentamer) and TOH. For the purposes of the present invention, as implicitly stated supra, the M/Q ratio {M(resin)+M(neopentamer)}/Q(resin)+Q(neopentamer)} represents the ratio of the total number of triorganosiloxy groups of the resinous and neopentamer portions of (i) to the total number of silicate groups of the resinous and neopentamer portions of (i). It will, of course, be understood that the above definition of the M/Q mole ratio accounts for the neopentamer resulting from the preparation of resin (i) and not for any intentional addition of neopentomer.

In order to obtain the preferred hot melt PSA compositions of the invention, resin (i) must be a solid at room temperature. That is, it must have a softening point above ambient preferably above 40° C. When this condition is not realized, the PSAs obtained do not exhibit a non-slump character, as defined infra.

It is further preferred that the resinous portion of component (i) have a number average molecular weight ($M_n$) of about 1,500 to 15,000 when measured by gel permeation chromatography (GPC), the neopentamer peak being excluded from the measurement. In this molecular weight determination, narrow fractions of MQ resins are used to calibrate the GPC equipment, the absolute molecular weights of the fractions being first ascertained by a technique such as vapor phase osmometry. This molecular weight is preferably above about 3,000, most preferably 4,500 to 7,500, since the thermal hold of the resulting cured adhesive is significantly greater than when the $M_n$ is less than about 3,000. The term "thermal hold" is defined herein as the adhesive strength of the cured PSA at elevated temperatures (e.g., 150° C.).

Component (i) can be prepared by well known methods. It is preferably prepared by the silica hydrosol capping process of Daudt, et al., U.S. Pat. No. 2,676,182; as modified by Brady U.S. Pat. No. 3,627,851; and Flannigan, U.S. Pat. No. 3,772,247; each patent being incorporated herein by reference to teach how to prepare soluble organopolysiloxanes which meet the requirements of the present invention. These methods employ an organic solvent such as toluene or xylene, and provide a solution wherein the resin typically has a hydroxyl content of about 1 to 6 percent (based on the weight of resin solids), this value preferably being 2.5 to 4.5 percent by weight. As is well known in the art, the hydroxyl content of the resin can be reduced (e.g., to 0.5% by weight) by capping the resin with a chlorosilane or silazane, such as trimethylchlorosilane or hexamethyldisilazane. Such a capped resin provides a composition of the invention which has a lower tendency to form gels than one containing resins having higher hydroxyl levels.

Component (ii) of the present invention is a diorganopolysiloxane polymer which contains at least two reactive silicon-bonded alkoxy groups and at least one carbon-bonded amine group in its molecule, said alkoxy radicals having 1–4 carbon atoms. By "reactive" it is meant that the alkoxy group will react with water to allow the compositions of the invention to cure when exposed to moisture. The repeat units of diorganopolysiloxane (ii) are $R_2SiO_{2/2}$ siloxy units wherein R is independently selected from the same hydrocarbon and halogenated hydrocarbon radicals delineated above for component (i). Component (ii) can comprise a single diorganopolysiloxane or a mixture of two or more different diorganopolysiloxanes. For example, component (ii) can contain a polydiorganosiloxane having hydrolyzable functionality, such as alkoxy or ketoximo, in its molecule. The degree of polymerization (DP) of the polymer (or polymers) comprising component (ii) is such that this polymer (or polymer mixture) has a viscosity at 25° C. of about 20 to 100,000, preferably 50 to 50,000 and most preferably 350 to 15,000 centipoise. It is preferred that at least 50%, and preferably at least 85%, of the organic radicals along the chain of component (ii) are methyl radicals, which radicals can be distributed in any manner in the diorganopolysiloxane. Further, component (ii) can comprise up to about 20 mole percent of siloxane branching sites provided it meets the above viscosity requirements.

The alkoxy and amine functionality may be located at the ends of the diorganopolysiloxane polymer, along the chain of the polymer, or both. Preferably, both functionalities are attached to the same silicon atom of the polymer. As stated above, the alkoxy groups are attached to the polymer chain through silicon atoms while the amine groups are attached to the silicon atoms of the polymer through an organic connecting group, described infra.

For the purposes of the present invention, the alkoxyfunctional groups can have the general form represented by the formula $R_a(R''O)_{3-a}SiG$—, wherein R is as defined above, R'' is an alkyl radical having 1–4 carbon atoms, G represents a divalent group linking the silicon atom of the terminal unit with a silicon atom of the polymer chain and a is 0 or 1.

In the above formula, G represents any divalent group or atom which is not hydrolyzable and links the terminal alkoxy-functional units to the main chain of polymer (ii) such that this terminal unit is not removed during curing of the composition and the curing reaction is not adversely affected. Hydrolytically stable linkages represented by G include, but are not limited to, oxygen, hydrocarbon, such as alkylene and phenylene, and hydrocarbon groups which contain one or more hetero atoms selected from oxygen, nitrogen and sulfur. Suitable structures for linking group G include —(OSiMe₂)CH₂CH₂—, —(CH₂CH₂SiMe₂)(OSiMe₂)CH₂CH₂—, —(CH₂CH₂SiMe₂)(OSiMe₂)O—, —(CH₂CH₂SiMe₂)CH₂CH₂—, —CH₂CH₂—, —(OSiMe₂)O — and —O—. Specific examples of alkoxy groups include such structures as (MeO)₃SiCH₂CH₂—, (MeO)₃SiO—, Me(MeO)₂SiO—, (EtO)₃SiO—, (MeO)₃SiCH₂CH₂Si(Me₂)OSi(Me₂)CH₂CH₂ and (MeO)₃SiCH₂CH₂SiMe₂O—, wherein Et hereinafter denotes an ethyl radical. The preparation of diorganopolysiloxane polymers having such groups is described in detail in above cited application 748,478, hereby incorporated by reference to teach these preparative methods. Moisture reactive groups having the representative formulae (MeO)₃SiO— and Me(MeO)₂SiO— can be introduced into a silanol-terminated diorganopolysiloxane by compounds having the formulae (MeO)₄Si and Me(MeO)₃Si, respectively, as is well known in the art.

The amine groups are of the general form represented by the formula $N(R''')_2$—Q—, wherein R is independently selected from the group consisting of hydrogen, phenyl and alkyl radical having 1–6 carbon atoms and Q is a divalent hydrocarbon or nitrogen-substituted hydrocarbon connecting group having from 3 to 6 carbon atoms (i.e., the amine functionality can be primary, secondary or tertiary). Preferably, the amine group contains primary amine functionality. Specific examples of suitable amine groups include such structures as
—CH₂CH₂CH₂NH₂,
—CH₂CH₂CH₂N(H)CH₂CH₂NH₂,
—CH₂CH₂CH₂N(H)CH₂CH₂n(H)CH₂CH₂NH₂,
—CH₂CH₂CH₂CH₂NH₂,
—CH₂CH₂CH₂CH₂CH₂NH₂, CH₂CH₂CH₂NMe₂,
—CH₂CH₂CH₂N(H)CH₂CH₂NMe₂, and
—CH₂CH(CH₃)CH₂NH₂, inter alia. The diorganopolysiloxane (ii) containing alkoxy groups and amine groups can be prepared by reacting a hydroxyl-functional diorganopolysiloxane with an amine-functional alkoxysilane, this reaction providing a polymer wherein both the alkoxy group and the amine group resides on the same silicon atom. Thus, for example, a hydroxyl-functional polydimethylsiloxane can be reacted according to the following scheme:

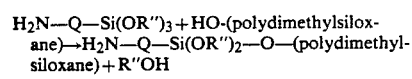

$H_2N$—Q—Si(OR'')₃ + HO-(polydimethylsiloxane) → $H_2N$—Q—Si(OR'')₂—O—(polydimethylsiloxane) + R''OH wherein Q is as defined above and R'' is an alkyl group having 1 to 4 carbon atoms. Alternatively, the above reaction can be carried out using a mixture of an alkoxysilane, such as methyltrimethoxysilane, tetraethoxysilane, tetramethoxysilane, dimethyldimethoxysilane or phenyltrimethoxysilane, and an amine-functional alkoxysilane to obtain a polydiorganosiloxane having a statistical distribution of amine groups and alkoxy groups on different silicon atoms. The latter scheme may be practiced sequentially or simultaneously. Additionally, different structures may be prepared by equilibrating the above polymers with additional diorganosiloxane units using a siloxane redistribution catalyst, such as an alkali metal hydroxide or silanolate. Such equilibration procedures may also be employed to obtain a statistical distribution of alkoxy and amine groups by reacting a mixture of cyclic diorganopolysiloxane, an aminoalkoxysilane and an alkoxysilane.

A preferred polydiorganosiloxane (ii) of the invention is a linear polydimethylsiloxane terminated with groups having the formula $H_2N-Q-Si(OR'')_2-O-$, wherein Q is $-CH_2CH_2CH_2-$, $-CH_2CH_2N(H)CH_2CH(CH_3)CH_2-$, $CH_2CH(CH_3)CH_2-$ or $-CH_2CH_2N(H)CH_2CH_2CH_2-$ and R'' is ethyl or methyl.

Hydrolyzable silane (iii) of the present invention is represented by the formula $R'_{4-y}SiX_y$, in which R' is selected from the group consisting of hydrocarbon radicals and halogenated hydrocarbon radical having 1-6 carbon atoms. X in the above formula is a hydrolyzable group, such as alkoxy, acetamido or ketoxime group and y is 2 to 4. Preferably, X of silane (iii) is a ketoxime group of the general form $-ON=C(R''')_2$, in which each R''' independently represents an alkyl radical having 1-6 carbon atoms or a phenyl radical. This is particularly preferred when resin (i) has a number average molecular weight of more than about 4,000 and the use of, e.g., an alkoxysilane has not been shown to prevent undesired gelation during preparation of the instant compositions. Specific examples of such preferred ketoximosilanes include tetrakis(methylethylketoximo)silane, methyl-tris(methylethylketoximo)silane and vinyl-tris(methylethylketoximo)silane.

The optional catalyst (iv) which may used to further accelerate the cure of the instant compositions upon exposure to moisture may be selected from those compounds known in the art to promote the hydrolysis and subsequent condensation of alkoxy groups on silicon. Suitable curing catalysts include tin IV salts of carboxylic acids, such as dibutyltin dilaurate, and organotitanium compounds such as tetrabutyl titanate and partially chelated derivatives of these salts with chelating agents such as acetoacetic acid esters and beta-diketones.

In the compositions of the present invention, the weight ratio of resin (i) to diorganopolysiloxane polymer (ii) can range from about 20:80 to 80:20. When the composition is to be a hot melt PSA, this ratio should be in the range of 50:50 to 70:30, preferably 55/45 to 65/35. Such ratios can provide a moisture-curable, hot-melt PSA which is a non-slump solid at room temperature and cures to form an elastomer. When this ratio is below about 50:50, the compositions are fluids which do not exhibit non-slump character; when this ratio is above about 70:30, the compositions exhibit an increased tendency to produce embrittled materials upon cure (i.e., they do not form elastomers). By "non-slump" it is meant that the material appears to be a solid such that, when a 60 cc jar is filled to about one third capacity with the material and tipped on its side at room temperature (i.e., about 25° C.). essentially no flow is observed within a 20 minute period. This corresponds to a minimum room temperature dynamic viscosity in the approximate range $2 \times 10^7$ to $8 \times 10^7$ cP when measured at 1 radian/sec. The hot melt compositions of the invention flow at elevated temperatures and can readily be extruded from a conventional hot melt gun (e.g., the dynamic viscosity is preferably of the order $10^4$ cP at $\leq 200°$ C.).

Optional hydrolyzable silane (iii) is employed in the instant compositions at a level sufficient to provide stability to said composition. Thus, even though many compositions which do not contain hydrolyzable silane (iii) cure and otherwise fit the general parameters of the present invention, a small amount of hydrolyzable silane is preferred to impart stability to the composition so that it can be stored for a reasonable period, such as several months, without forming gels. This is particularly true when resin (i) contains more than about 1% by weight of hydroxyl groups. It is thus preferred to add the hydrolyzable silane to the instant compositions such that the molar ratio of hydrolyzable silane to hydroxyl functionality on resin (i) is at least 0.3. preferably about 0.6 to 2.5.

Finally, catalyst (iv) may be added if the cure rate is to be further accelerated. Its amount can readily be determined by the skilled artisan through routine experimentation.

In order to prepare the compositions of the present invention which do not contain hydrolyzable silane (iii), polydiorganosiloxane (ii) is thoroughly mixed with an organic solvent solution of resin (i). The solvent employed is preferably the one used to prepare the resin component, as described supra. If the hydrolyzable silane is to be used, it is first blended with the solution of resin (i) and then diorganopolysiloxane (ii) is mixed with this combination. The organic solvent may then be stripped off to provide an essentially solvent-free composition, as would be required for the hot melt PSAs of the invention. The stripping (devolatilization) can be effectively accomplished by heating the mixture under vacuum, for example at 90° C. to 150° C. and <10 millimeters of mercury in a batch operation. The removal of solvent can also be accomplished by any of the known techniques, such as contact with a stream of inert gas, evaporation, distillation, thin film stripping, and the like. Excessively high temperatures should be avoided when all the components are being devolatilized. A temperature of 200° C., and preferably 150° C. should not be exceeded. Catalyst (iv) may be added at this point if desired. This catalyst may also be added to the solution of resin (i) and polydiorganosiloxane (ii).

It is, of course, understood that the above procedures are to be carried out in the absence of moisture in order to prevent premature curing of the compositions. This also applies to subsequent storage of the compositions.

In general, small amounts of additional ingredients may be added to the compositions of this invention. For example, antioxidants, pigments, stabilizers, fillers, etc., may be added as long as they do not materially alter the requirements stipulated herein.

The compositions of the instant invention may be applied to various substrates by techniques well known in the art. For example, when the viscosity is sufficiently low or is adjusted with solvents, these systems may be coated onto substrates and used as an adhesive or coating composition.

When the systems are hot melt PSAs, these formulations may be applied by methods currently employed for dispensing organic hot melt formulations (e.g., hot melt gun, hot spraying, extrusion or spreading by hot draw-down bars, heated doctor blades, calendar rolls, etc.). The common factor in the latter methods is that the composition is heated to a temperature sufficient to induce flow before application. Upon cooling to ambient conditions, the hot melt compositions of the present invention are tacky, non-slump PSAs which may be used to bond components or substrates to one another. Alternatively, the bonding can take place while the adhesive is still hot, but the latter will not, of course, support much stress under these conditions and the bonded parts would have to be held in place until the PSA cooled.

After the composition of the invention is coated onto a substrate or used to bond components, the combination is exposed to ambient air so as to cure the composition to an elastomer which either retains its tack or forms an essentially tack-free surface. "Essentially tack-free" is used herein to indicate that the surface does not exhibit a measurable degree of tack and feels dry or nearly dry to the touch. The time required for completion of this cure process ranges from about one day to more than one month, depending on whether catalyst is employed, catalyst level, temperature and humidity, inter alia. As a result of this cure, the adhesive strength of the instant hot melt PSA compositions is greatly augmented.

The compositions of this invention find utility in many of the same applications as now being served by silicone coatings and PSAs, particularly in such industries as automotive, electronic, structural, medical, electrical, construction, space, marine (e.g., as anti-fouling coatings), inter alia.

EXAMPLES

The following examples are presented to further illustrate the compositions of this invention, but are not to be construed as limiting the invention, which is delineated in the appended claims. All parts and percentages in the examples are on a weight basis and all measurements were obtained at 25° C. unless indicated to the contrary.

The following components, listed alphabetically for ease of reference, were used in the examples.

Fluid A = a reaction product of 200 parts of a silanol-terminated polydimethylsiloxane exhibiting a viscosity of about 0.07 Pa.s (70 cP) at 25° C and 40.6 parts of gamma-(2-aminoethylamino)propyltrimethoxysilane (95% purity). wherein the polydimethylsiloxane was slowly added to the silane. The mixture was reacted at 40° C. for one hour and then at about 60° C. for two more hours. The resulting fluid had a viscosity of 78 cP.

Fluid B = a reaction product of 200 parts of a silanol-terminated polydimethylsiloxane having an average degree of polymerization of 400 (viscosity = 2,000 cP) and 3.5 parts of gamma-(2-aminoethylamino)propyltrimethoxysilane (95% purity). wherein the polydimethylsiloxane was slowly added to the silane. The reaction was conducted at 55-60 degrees for two hours and substantially all of the initial silanol groups were reacted.

Fluid C = a reaction product of a 75 parts by weight of a silanol-terminated polydimethylsiloxane having an average degree of polymerization (DP) of 15 with 10 parts of methyltrimethoxysilane and 15 parts of gamma-(2-aminoethyl-amino)propyltrimethoxysilane.

Fluid D = a 50 weight percent solution in isopropanol of a polydimethylsiloxane prepared by reacting a silanol terminated polydimethylsiloxane exhibiting a viscosity of 0.075 Pa.s (75 cP) with a stoichiometric excess, based on silanol groups, of gamma(2-aminoethylamino)propyltrimethoxysilane.

Fluid E = a mixture consisting of 75% Fluid B and 25% of a methyldimethoxysiloxy terminated polydimethylsiloxane having an average degree of polymerization of 40.

MTO = methyl-tris(methylethylketoximo)silane of the formula $MeSi(ON=C(Et)Me)_3$, in which Et denotes an ethyl radical.

Resin 1 = a 72% solution in xylene of a solid MQ resin consisting essentially of trimethylsiloxy units and $SiO_{4/2}$ unit in a molar ratio of about 0.63:1 and having a silicon-bonded hydroxyl content of about 3.7 weight percent and a number average molecular weight ($M_n$) of about 5.000.

Resin 2 = a 62% solution in xylene of Resin 1 wherein the resin has been capped with trimethylsiloxy groups so as to provide a residual silicon-bonded hydroxyl content of about 0.8 weight percent.

Resin 3 = an 81% solution in xylene of a solid MQ resin consisting essentially of trimethylsiloxy units and $SiO_{4/2}$ unit in a molar ratio of about 1.1:1 and having a silicon-bonded hydroxyl content of about 3.2 weight percent and $M_n$ of about 2,700.

TBT = tetra n-butyl titanate.

TDIDE = 2,5-di-isopropoxy-bis(ethylacetate) titanium.

The number average molecular weight of the above described resins was determined by gel-permeation chromatography (GPC) using Varian TSK 4000+2500 columns at 35° C., a chloroform mobile phase at 1 mL/min and an IR detector set at 9.1 microns to detect Si—O—Si. The GPC was calibrated using narrow fractions of similar resins as standards. The $M_n$ values reported herein exclude any neopentamer. $(Me_3SiO)_4Si$, present in the resin component. The hydroxyl content of the above resins was determined by FTIR.

The trimethylsiloxy/$SiO_{4/2}$ ratio of the resins was determined by $^{29}Si$ nmr and, in this case, the reported results include any neopentamer component present in the resin.

Adhesion Testing

Adhesive strength of PSA compositions was determined as a function of cure time under ambient conditions using a plastic box construction. The box construction comprised four integrally-formed side walls and a detachable, form-fitting bottom plate. The box had a generally rectangular cross-section measuring 3.5 cm wide×6 cm long, had a wall height of 1.5 cm and had a wall thickness of 5 mm. Each side wall had a 3 mm wide recessed step along its bottom interior edge for receiving said bottom plate such that the exterior surface of the latter was flush with said edges when seated on said step.

In a typical adhesion evaluation, the plate was detached and a thin bead of molten PSA was extruded from a heated metal cartridge (approximately 150° C.) along the 3 mm wide step. The bottom plate was pressed into place so as to contact the adhesive on the step and thereby provide a box having an open top. The box additionally had external protrusions in two of its opposite walls which allowed it to be constrained in a special jig while the bottom plate was pushed out with the ram of an arbor press apparatus, the apparatus having been modified to measure the applied force. The force necessary to push the bottom plate out of the wall section was recorded and the test repeated on identical box constructions at various storage times at ambient conditions to assess adhesion and its improvement with cure.

EXAMPLE 1

Resin 2 (73.3 g) was mixed with 25.5 g of Fluid A. This mixture was stripped at 150° C. and approximately 2 mm Hg pressure to remove solvent and excess silane monomer. While still hot and pourable, the product was transferred to a metal cartridge and allowed to cool.

The product was a non-slump hot melt PSA having a resin/polymer Ratio of 65/35.

(COMPARATIVE) EXAMPLE 1A

Resin 2 (73.3 g) blended with 24.5 g of a methyldimethoxysiloxy-endblocked polydimethylsiloxane having a viscosity of 54 cP. The mixture was stripped as in Example 1. The product was then transferred to a metal cartridge and allowed to cool. The resin/polymer ratio was 65/35.

(Comparative) Example 1B

Comparative Example 1A was repeated with the exception that 0.35 g of TBT catalyst was dispersed in the mixture while it was still hot. The resin/polymer ratio was 65/35.

Each of these three compositions was loaded into a hot melt gun and heated and applied to the box construction and tested. as described above. The measured adhesive values, as a function of cure time at ambient conditions are shown in the following table.

| SAMPLE | FORCE (lb) REQUIRED TO DE-LAMINATE PLATE | | | |
|---|---|---|---|---|
| | 20 minutes | 1 hour | 24 hours | 1 week |
| Example 1 | 74 | 83 | 96 | 186 |
| Comp. Ex. 1A | 55 | 45.5 | 74 | 85 |
| Comp. Ex. 1B | 81 | 80 | 46 | 53 |

It is seen that the composition of the present invention attained a significantly greater adhesive strength, and in less time, than either the uncatalyzed methoxy-functional system or a catalyzed version thereof.

EXAMPLE 2

Resin 2 (67.6 g) was mixed with 28.0 g of Fluid B and the mixture stripped as in Example 1. While still hot and pourable, the product was transferred to a metal cartridge where it was allowed to cool. The product was a non-slump hot melt PSA having a resin/polymer ratio of 60/40. This composition was evaluated as above

| CURE TIME | FORCE (lb) |
|---|---|
| 10 sec. | 45 |
| 20 min. | 60 |
| 1 hr. | 80 |
| 4 hr. | 90 |

(COMPARATIVE) EXAMPLE 2

This example again illustrates the slow build in adhesive strength of an adhesive composition similar to the one described in Example 2 wherein the polymer is an alkoxy-functional fluid and the composition contains no organometallic catalyst to promote crosslinking in the adhesive.

A resin/polymer blend was prepared by mixing 48.4 parts of Resin 2 and 20 parts of a methyldimethoxysiloxy-endblocked polydimethylsiloxane fluid having a degree of polymerization of approximately 400. This combination was devolatilized as in Example 1, transferred to a metal cartridge and tested as before.

| CURE TIME | FORCE (lb) |
|---|---|
| 1 min. | 6 |
| 20 min. | 13.5 |
| 1 hr. | 21.5 |
| 24 hr. | 36 |
| 8 days | 40.5 |

EXAMPLE 3

Resin 2 (69.89 g) was mixed with 26.6 g of Fluid A and this combination was devolatilized by heating the system at <10 mm Hg and 150° C. The devolatilized product was then transferred to a metal cartridge and allowed to cool. The product was a non-slump hot melt PSA having a resin/polymer ratio of 62/38. This product was tested using the above described box construction and the force required to delaminate the bottom plate of the box after 8 days was determined to be 216 lb Examination of the ruptured interfaces indicated that the bonds had failed cohesively.

(COMPARATIVE) EXAMPLE 3

An adhesive formulation similar to that of Example 3 was prepared with the exception that a triethoxysiloxy-endblocked polydimethylsiloxane was used as the polymer component.

Tetraethylorthosilicate (36.1 g) was thoroughly blended with 200 g of a silanol-endblocked polydimethylsiloxane fluid having a DP of about 40 and a viscosity of about 70 cP. The mixture was heated to 40° C. at which point 1.0 g of tetrabutyl titanate was added. The mixture was then heated and maintained at 60° C. for about two hours. The reaction product was allowed to cool to room temperature and was then recovered.

Resin 2 (69.9 g) was mixed with 26.6 g of the above prepared triethoxysiloxy-endblocked polydimethylsiloxane fluid and this combination then devolatilized as in Example 3. The product, which also had a resin/polymer ratio of 62/38, was transferred to a metal cartridge and tested as before. The force required to delaminate the bottom plate of the box construction after B days was found to be approximately 92 lb Examination of the ruptured interfaces indicated that the bonds had failed cohesively.

EXAMPLE 4

This example illustrates the use of a blend of alkoxy-functional and aminoalkoxy-functional polyorganosiloxanes in an adhesive composition.

Resin 1 (58.2 g). 28.0 g of Fluid E. 24.4 g of 95% pure MTO and 0.35 g of tetrabutyltitanate were combined and thoroughly blended in a glass reactor. The mixture was then heated to a temperature of 150° C. under a final pressure no higher than 10 mm Hg. Approximately 0.35 gm of TDIDE was then dispersed in the devolatilized, molten mixture, following which the mixture was transferred to a metal cartridge where the material was permitted to cool to room temperature. The product was a fluid having a viscosity of about 500,000 cP and a resin/polymer ratio of 65/35.

This adhesive composition was evaluated for its adhesive strength as a function of cure time at room temperature as described above, the results being shown below.

| CURE TIME | FORCE (lb) |
|---|---|
| 20 min. | 7 |

-continued

| CURE TIME | FORCE (lb) |
|---|---|
| 1 hr. | 13 |
| 24 hr. | 121 |
| 7 days | >200 |

EXAMPLE 5

Resin 1 (58.2 g), 28.0 g of Fluid B and 24.4 g of MTO were mixed and 0.35 g of TBT was dispersed therein. The mixture was then stripped at a temperature of 150° C. under a final pressure no higher than 10 mm Hg. Approximately 0.35 g of TDIDE was then dispersed in the devolatilized, molten mixture, following which the mixture was transferred to a metal cartridge. The product was a non-slump hot melt PSA having a resin/polymer ratio of 60/40.

This hot melt PSA composition was evaluated for its adhesive strength as a function of cure time at room temperature as described above, the results being shown below.

| CURE TIME | FORCE (lb) |
|---|---|
| 2 min | 18 |
| 1 hr. | 30 |
| 14 hr. | 94 |

(COMPARATIVE) EXAMPLE 4

The procedure of Example 5 was repeated wherein phenyltrimethoxysilane (on a molar basis) was substituted for the MTO. The mixture gelled during processing. This comparative example demonstrates the preferred use of a ketoximosilane when the molecular weight of the resin is more than about 4,000 and contains more than about 1% by weight of silicon-bonded hydroxyl.

EXAMPLE 6

The method of Example 1 was used to prepare hot melt PSAs based on Resin 3 and Fluid C wherein no catalyst was used and the resin/polymer ratios is shown in the table below. These were tested as described above and the effect of the resin/polymer ratio was observed, as reported in the following table.

| | Resin/Polymer Ratio | | |
|---|---|---|---|
| Cure Time | 75/25 | 70/30 | 65/35 |
| 4 hr. | 4 lb | 66 lb | 38 lb |
| 1 day | 10 lb | 27 lb | 66 lb |
| 7 days | 6 lb | 32 lb | 96 lb |

EXAMPLE 7

The method of Example 1 was used to prepare PSAs based on Resin 3 and Fluid D at a resin/polymer ratio of 65/35. In this case, 0.5 percent by weight of stannous octoate catalyst was added to Sample B (see table below) and was present during the devolatilization step. Upon completion of the devolatilization step, portions of the hot product were poured into small vials. Once the compositions had cooled to room temperature, it was noted that Sample A was still flowable while Sample B was a non-slump hot melt PSA. Both compositions were tested according the procedure described above, the results being shown in the table below.

| FORCE AS A FUNCTION OF CURE TIME | | | |
|---|---|---|---|
| | 20 Minutes | 4 Hours | 24 Hours |
| Sample A | 20 lb | 18 lb | 43 lb |
| Sample B | 32 lb | 53 lb | 118 lb |

That which is claimed is:

1. A moisture-curable silicone composition comprising:
   (i) a hydroxyl-functional organopolysiloxane resin comprising $R_3SiO_{\frac{1}{2}}$ siloxane units and $SiO_{4/2}$ siloxane units, wherein the mole ratio of the $R_3SiO_{\frac{1}{2}}$ siloxane units to $SiO_{4/2}$ siloxane units has a value of from 0.5/1 to 1.2/1 and R is selected from the group consisting of hydrocarbon radicals and halogenated hydrocarbon radicals;
   (ii) a diorganopolysiloxane polymer having at least two silicon-bonded alkoxy groups and at least one carbon-bonded amine group in its molecule, said polymer having a viscosity at 25° C. of 20 to 100,000 centipoise, the weight ratio of said resin to said polymer being in the range 20:80 to 80:20;
   (iii) optionally, a hydrolyzable silane in sufficient amount to provide stability to said composition; and
   (iv) optionally, sufficient catalyst to accelerate the cure of said composition.

2. The composition according to claim 1, wherein the amount of said hydrolyzable silane (iii) used is sufficient to provide a molar ratio of said hydrolyzable silane to the hydroxyl functionality on said resin (i) of 0.3 to 2.5.

3. The composition according to claim 2, wherein R of said resin (i) is methyl.

4. The composition according to claim 3, wherein said diorganopolysiloxane polymer (ii) is polydimethylsiloxane.

5. The composition according to claim 4, wherein said polydimethylsiloxane contains groups of the formula $H_2N—Q—Si(OR")_2—O—$ in its molecule, wherein Q is a divalent hydrocarbon or nitrogen-substituted hydrocarbon group having 3 to 6 carbon atoms and R" is an alkyl radical having 1 to 4 carbon atoms.

6. The composition according to claim 5, wherein the viscosity of said polydimethylsiloxane (ii) is 50 to 50,000 cP at 25° C.

7. The composition according to claim 6, wherein the hydroxyl content of said resin (i) is 2.5 to 4.5 percent by weight.

8. The composition according to claim 7, wherein in said polydimethylsiloxane the group of the formula $H_2N—Q—Si(OR")_2—$ is terminal, and Q is selected from the group consisting of —CH$_2$CH$_2$N(H)CH$_2$CH(CH$_3$)CH$_2$—, —CH$_2$CH(CH$_3$)CH$_2$—, —CH$_2$CH$_2$CH$_2$— and —CH$_2$CH$_2$—NH—CH$_2$CH$_2$CH$_2$— and R" is selected from the group selected from the group consisting of ethyl and methyl.

9. The composition according to claim 8, wherein said hydrolyzable silane (iii) is selected from the group consisting of tetrakis(methylethylketoximo)silane, methyl-tris(methylethylketoximo)silane and vinyl-tris(methylethylketoximo)silane.

10. A moisture-curable silicone hot melt pressure-sensitive adhesive composition comprising:

(i) a solid hydroxyl-functional organopolysiloxane resin comprising $R_3SiO_{\frac{1}{2}}$ siloxane units and $SiO_{4/2}$ siloxane units, wherein the mole ratio of the $R_3SiO_{\frac{1}{2}}$ siloxane units to $SiO_{4/2}$ siloxane units has a value of from 0.5/1 to 1.2/1 and R is selected from the group consisting of hydrocarbon radicals and halogenated hydrocarbon radicals;

(ii) a diorganopolysiloxane polymer having at least two silicon-bonded alkoxy groups and at least one carbon-bonded amine group in its molecule, said polymer having a viscosity at 25° C. of 20 to 100,000 centipoise, the weight ratio of said resin to said polymer being in the range 50:50 to 70:30;

(iii) optionally, a hydrolyzable silane in sufficient amount to provide stability to said composition; and (iv) optionally, sufficient catalyst to accelerate the cure of said composition, said composition being an essentially solvent-free non-slump solid at room temperature which cures to an elastomer upon exposure to moisture.

11. The composition according to claim 10, wherein the amount of said hydrolyzable silane (iii) used is sufficient to provide a molar ratio of said hydrolyzable silane to the hydroxyl functionality on said resin (i) of 0.3 to 2.5.

12. The composition according to claim 11, wherein R of said resin (i) is methyl.

13. The composition according to claim 12, wherein said diorganopolysiloxane polymer (ii) is polydimethylsiloxane.

14. The composition according to claim 13, wherein said polydimethylsiloxane contains groups of the formula $H_2N—Q—Si(OR'')_2—O—$ in its molecule, wherein Q is a divalent hydrocarbon or nitrogen-substituted hydrocarbon group having 3 to 6 carbon atoms and R'' is an alkyl radical having 1 to 4 carbon atoms.

15. The composition according to claim 14, wherein the viscosity of said polydimethylsiloxane (ii) is 50 to 50,000 cP at 25° C.

16. The composition according to claim 15, wherein the hydroxyl content of said resin (i) is 2.5 to 4.5 percent by weight.

17. The composition according to claim 16, wherein in said polydimethylsiloxane the group of the formula $H_2N—Q—Si(OR'')_2—$ is terminal, and Q is selected from the group consisting of $—CH_2CH_2N(H)CH_2CH(CH_3)CH_2—$, $—CH_2CH(CH_3)CH_2—$, $—CH_2CH_2CH_2—$ and $—CH_2CH_2—NH—CH_2CH_2CH_2—$ and R'' is selected from the group consisting of ethyl and methyl.

18. The composition according to claim 17, wherein said hydrolyzable silane (iii) is selected from the group consisting of tetrakis(methylethylketoximo)silane, methyl-tris(methylethylketoximo)silane and vinyl-tris(methylethylketoximo)silane.

19. The composition according to claim 10, wherein the weight ratio of said resin (i) to said polydiorganosiloxane (ii) is 55/45 to 65/35.

20. The composition according to claim 11, wherein the weight ratio of said resin (i) to said polydiorganosiloxane (ii) is 55/45 to 65/35.

21. The composition according to claim 14, wherein the weight ratio of said resin (i) to said polydiorganosiloxane (ii) is 55/45 to 65/35.

22. The composition according to claim 15, wherein the weight ratio of said resin (i) to said polydiorganosiloxane (ii) is 55/45 to 65/35.

23. The composition according to claim 17, wherein the weight ratio of said resin (i) to said polydiorganosiloxane (ii) is 55/45 to 65/35.

24. The composition according to claim 10, wherein said hydrolyzable silane (iii) is a ketoximosilane.

25. The composition according to claim 11, wherein said hydrolyzable silane (iii) is a ketoximosilane.

26. The composition according to claim 14, wherein said hydrolyzable silane (iii) is a ketoximosilane.

27. The composition according to claim 15, wherein said hydrolyzable silane (iii) is a ketoximosilane.

28. The composition according to claim 17, wherein said hydrolyzable silane (iii) is a ketoximosilane.

* * * * *

UNITED STATES PATENT AND TRADEMARK OFFICE
CERTIFICATE OF CORRECTION

PATENT NO. : 5,302,671

DATED : April 12, 1994

INVENTOR(S) : Martin Eric Cifuentes, Michael R. Strong, William P. Brady, William N. Fenton, Randall G. Schmidt, David L. Stickles, Bernard VanWert It is certified that error appears in the above-identified patent and that said Letters Patent is hereby corrected as shown below:

Column 14, line 43,

In Claim 5, line 3 the formula should read $H_2N-Q-Si(OR'')_2-O-$.

Column 14, line 55,

In Claim 8, line 3 the formula should read $H_2N-Q-Si(OR'')_2-O-$.

Column 16, line 6,

In Claim 17, line the formula should read $H_2N-Q-Si(OR'')_2-O-$.

Signed and Sealed this

Twenty-first Day of February, 1995

Attest:

BRUCE LEHMAN

Attesting Officer      Commissioner of Patents and Trademarks